United States Patent [19]

Light

[11] Patent Number: 5,420,212
[45] Date of Patent: May 30, 1995

[54] POLYESTER/POLYCARBONATE/POLYCAPROLACTONE BLENDS

[75] Inventor: Ronald R. Light, Kingsport, Tenn.

[73] Assignee: Eastman Chemical Company, Kingsport, Tenn.

[21] Appl. No.: 221,132

[22] Filed: Mar. 31, 1994

[51] Int. Cl.⁶ .................. C08L 67/02; C08L 67/04; C08L 69/00
[52] U.S. Cl. .................. 525/411; 525/415; 525/439
[58] Field of Search .................. 525/411, 415, 439

[56] References Cited

U.S. PATENT DOCUMENTS

| | | |
|---|---|---|
| 2,465,319 | 3/1949 | Whinfield et al. . |
| 3,047,539 | 7/1962 | Pengilly . |
| 3,153,008 | 10/1964 | Fox . |
| 3,218,372 | 11/1965 | Okamura et al. . |
| 4,018,750 | 4/1977 | Onizawa .................. 526/49 |
| 4,029,631 | 6/1977 | Bollen et al. . |
| 4,123,436 | 10/1978 | Holub et al. . |
| 4,123,473 | 10/1978 | Amin et al. .................. 426/108 |
| 4,230,656 | 10/1980 | Amin et al. .................. 426/322 |
| 4,536,531 | 8/1985 | Ogawa .................. 525/437 |
| 4,778,251 | 10/1988 | Brown et al. .................. 525/67 |
| 5,041,493 | 8/1991 | Natarajan .................. 525/415 |

*Primary Examiner*—David Buttner
*Attorney, Agent, or Firm*—Karen A. Harding; Harry J. Gwinnell

[57] ABSTRACT

This invention relates to a polymer blend comprising:
  (a) a concentrate comprising a polycarbonate resin, polycaprolactone and a copolyester having repeat units derived from terephthalic acid, ethylene glycol and 1,4-cyclohexanedimethanol; and
  (b) a copolyester having repeat units derived from terephthalic acid, ethylene glycol and 1,4-cyclohexanedimethanol.

10 Claims, No Drawings

POLYESTER/POLYCARBONATE/POLYCAPROLACTONE BLENDS

FIELD OF THE INVENTION

This invention relates to blends containing polyesters having repeating units from terephthalic acid, ethylene glycol, and minor amounts of 1,4-cyclohexanedimethanol; polycarbonates; and polycaprolactone.

BACKGROUND OF THE INVENTION

Blends of poly(ethylene terephthalate) (PET) and polycarbonate are generally known for molding purposes. U.S. Pat. Nos. 4,029,631, 4,123,473 and 4,230,656 specifically disclose such blends.

U.S. Pat. Nos. 4,123,473 and 4,230,656 disclose transparent sheets produced from poly(ethylene terephthalate)/polycarbonate blends. U.S. Pat. No. 4,029,631 discloses the use of a degraded polycarbonate resin to deliver an antiblock resin to a poly(ethylene terephthalate) extruded sheet.

No known prior art references discuss the use of the PET/polycarbonate blends in combination with polycaprolactone for preparing a concentrate to improve the drop impact resistance of containers extrusion blow molded from a high molecular weight poly(ethylene terephthalate).

Despite considerable efforts in this area of technology, a need still exists for PET/polycarbonate/polycaprolactone blends which are useful in preparing a concentrate in order to improve the drop impact resistance of containers extrusion blow molded from a high molecular weight PET.

SUMMARY OF THE INVENTION

The invention comprises a polymer blend further comprising:

(a) about 1 to 10 weight % of a concentrate comprising:
  (1) about 70 to 95 weight % of a polycarbonate resin;
  (2) about 5 to 30 weight % polycaprolactone and
  (3) about 0 weight % to 25 weight % of a copolyester having repeat units derived from at least 90 mole % terephthalic acid, at least 85 mole % ethylene glycol and up to 15 mole % 1,4-cyclohexanedimethanol, said copolyester having a weight average molecular weight of between 40,000 and 55,000; and (b) about 99 to about 90 weight % of a copolyester having repeat units derived from at least 90 mole % terephthalic acid, at least 85 mole % ethylene glycol and up to 15 mole % 1,4-cyclohexanedimethanol, said copolyester having a weight average molecular weight of between 35,000 and 95,000.

The blends of the invention provide excellent clarity and impact strength.

DETAILED DESCRIPTION OF THE PREFERRED EMBODIMENTS

The polymer blends of this invention comprise two different components.

Component (1) (a) comprises about 1 to 10, preferably about 1 to 5 weight % of a concentrate further comprising:

(1) about 70 to 95 weight % of a polycarbonate resin; preferably 70 to 90, more preferably, 70 to 80

(2) about 5 to 30 weight % polycaprolactone, preferably 5 to 25, more preferably, 5 to 20, and (3) about 0 to 25 weight %, preferably 0 to 15, more preferably, 5 to 15, of a copolyester having repeat units derived from at least 90 mole % terephthalic acid, at least 85 mole % alkylene glycol and up to 15 mole % 1,4-cyclohexanedimethanol, said copolyester having a weight average molecular weight of between 40,000 and 55,000.

For component (1) (a) (3), the preferred range of terephthalic acid is about 90 to 100 mole %, the preferred range of 1,4-cyclohexanedimethanol is about 1.0 to 15 mole %, the preferred range of alkylene glycol is about 85 to 99 mole %. More preferably, the range of terephthalic acid is about 95 to 100 mole %, the most preferred range of 1,4-cyclohexane dimethanol is about 1.5 to 14 mole % and the preferred range of alkylene glycol is about 86 to 98.5 mole %. Preferred molecular weight range, 35,000 to 95,000 weight average molecular weight; most preferred weight average molecular weight range 40,000 to 55,000.

A preferred copolyester of component (1)(a)(3) is poly[(96.5)ethylene-co-(3.5)1,4-cyclohexylenedimethylene terephthalate] having a weight-average molecular weight between 40,000 and 55,000.

The second component of the polymer blend of the invention is component (1) (b), about 99 to about 90, preferably about 99 to about 95 weight % of a copolyester having repeat units derived from at least 90 mole % terephthalic acid, at least 85 mole % ethylene glycol and up to 15 mole % 1,4-cyclohexanedimethanol, said copolyester having a weight average molecular weight of between 35,000 and 95,000, more preferably 70,000 to 90,000.

For component (1) (b), the preferred range of terephthalic acid is about 90 to 100 mole %, the preferred range of 1,4-cyclohexanedimethanol is about 1.0 to 15 mole %, the preferred range of alkylene glycol is about 85 to 99 mole %. More preferably, the range of terephthalic acid is about 95 to 100 mole %, the most preferred range of 1,4-cyclohexane dimethanol is about 1.5 to 14 mole % and the preferred range of alkylene glycol is about 86 to 98.5 mole %.

A preferred copolyester of component (1)(b) is poly(96.5)ethylene-co-(3,5)1,4-cyclohexylenedimethylene terephthalate) having a weight average molecular weight of between 70,000 and 90,000.

Poly(ethylene terephthalate) resins which may be used in the blends of the present invention are well known and are available commercially and methods for their preparation are described, for example, in U.S. Pat. No. 2,465,319 and U.S. Pat. No. 3,047,539.

The dicarboxylic acid component may contain up to about 10 mole % of other conventional aromatic, aliphatic or alicyclic dicarboxylic acids, such as isophthalic acid, naphthalenedicarboxylic acid, cyclohexanedicarboxylic acid, succinic acid, sebacic acid, adipic acid, glutaric acid, azelaic acid, and the like.

The glycol component may contain up to about 15 mole % of other conventional aliphatic or alicyclic glycols such as diethylene glycol, triethylene glycol, ethylene glycol, propanediol, butanediol, pentanediol, hexanediol, and the like.

Higher molecular weight PET and PET modified with up to about 15 mole % 1,4-cyclohexanedimethanol, i.e., weight average of about 70,000–90,000 may be made by conventional methods such as melt phase polymerization followed by polymerization in the solid phase. Inherent viscosity (I.V.) ranges representing high molecular weight PET is about 0.9 to about 1.1, preferably about 0.95. The PET may be modified up to about 0.5 mole % with other conventional polyfunctional glycols, acids, and anhydrides.

Polycarbonate resins which are suitable for use in the present invention are well known in the art and are generally commercially available. These polycarbonates may be prepared by a variety of conventional and well known processes which include trans-esterification, melt polymerization, interfacial polymerization, etc. The polycarbonates are generally prepared by reacting a dihydric phenol with a carbonate precursor, such as phosgene. Suitable processes for preparing the polycarbonates of the present invention are described, for example, in U.S. Pat. Nos. 4,018,750, 4123,436, and 3,153,008. However, other known processes for producing polycarbonates are suitable. Particularly preferred processes for producing polycarbonates are suitable. Particularly preferred polycarbonates are aromatic polycarbonates, prepared by reacting bisphenol-A [2,2-bis(4-hydroxyphenyl)propane] with phosgene.

The polycarbonate based polymers can be modified or branched versions with melt flow rates of from about 2 to about 20 g/10 min., preferably, about 2 to about 11 g/10 min, and more preferably, about 2 to about 4 g/10 min. The melt flow rate is based on ASTM Method D-1238, condition 300–1.2 (300° C. with a 1.2 kilogram load). The level of carbonate used in the blend can range from about 70–95 weight percent, preferably 70 to 90 weight %.

Processes of the prior art for the production of poly(3-hydroxyalkanoates) include the polymerization of $\beta$-substituted-$\beta$-propiolactones which generally fall into two categories: (1) acid catalyzed reactions generally characterized by the use of Lewis acid catalysts containing metals such as aluminum or zinc, or (2) anionic ring opening polymerizations. The preferred poly(3-hydroxyalkanoate) is polycaprolactone.

The polycaprolactone as used in component (a) of the invention may have a weight average molecular weight of between 10,000 and 100,000, preferably, between 40,000 and 90,000.

It is also contemplated that linear aliphatic polyesters may be used in the place of polycaprolactone provided that the molecular weight of the linear aliphatic polyester be maintained between 40,000 and 90,000.

Examples of these linear aliphatic polyesters include poly(ethylene glutarate), poly(ethylene adipate), poly(butylene succinate), poly(butylene glutarate), poly(butylene adipate), poly(hexylene adipate), poly(hexylene trans-cyclohexanedicarboxylate), poly(1,4-cyclohexylenedimethylene glutarate) and poly(1,4-cyclohexylenedimethylene adipate). The copolyester of component (1)(a)(3) and component (1)(b) has an I.V. or inherent viscosity of at least 0.3 dL/g. The I.V. of the copolyester of component (a)(1)(3) and component (1)(b) may preferably range from about 0.3 to about 1.2 dL/g, and more preferably at a range of about 0.5 to about 1.1, preferably about 0.5 to about 1.0 dL/g.

The I.V. of the copolyester of component (1)(a)(3) and of component (1)(b) is determined at 25° C. in a solvent mixture consisting of 60% by weight phenol and 40% by weight tetrachloroethane.

In a preferred embodiment, the cyclohexanedimethanol component is a cis-/trans-mixture of 1,4-cyclohexanedimethanol. It is also preferred that the cyclohexanedimethanol is present at about 1.5 to 15 mole % and more preferably, at about 3 to 4 mole % in component (1)(a)(3). It is further preferred that the cyclohexanedimethanol is present at 15 to 15 mole % and more preferably, at 3 to 4 mole % in the in component (1)(b).

The blends of the invention may be made by conventional melt processing techniques. For example, pellets of the PET polyester of component (1)(a)(3) may be mixed with pellets of the polycarbonate and pellets of polycaprolactone and subsequently melt blended in either a single or twin screw extruder to form a homogenous mixture. The concentrate made therefrom is subsequently melt blended with pellets of PET polyester of component (1)(b).

In addition to the components discussed hereinabove, the blends of this invention may contain additives commonly employed with polyester resins, such as colorants, flame retardants such as a phosphorous compound, a halogen compound, or a halogen compound in combination with an antimony compound, mold release agents, antioxidants, tougheners, nucleating agents, ultraviolet light, and heat stabilizers and the like.

The blends of this invention are prepared by blending the components together by any convenient means to obtain an intimate blend. Compounding temperatures must be at least the melting point of the polyester. For example, the polyester can be mixed in a dry state in any suitable blender or tumbler with the other components and the mixture melt extruded. The extrudate can be chopped into pellets.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise indicated.

EXAMPLES

The following examples are provided to show the uniqueness of improving the impact of extrusion blow molding PET by blending it with a concentrate prepared with Polycarbonate, Polycaprolactone and another PET having a weight-average molecular weight in the range of 40,000 and 55,000.

Example 1

As a Control Example, Poly[(96.5)ethylene-co-(3.5)1,4-cyclohexylenedimethylene terephthalate] having a weight-average molecular weight of between 70,000 and 90,000 was dried in a dehumidifier dryer at around 330° F. (166° C.) for 4 hours and subsequently extrusion blow molded into round 10-ounce containers at a melt temperature of around 506° F. (263° C.) to 512° F. (267° C.) on the extrusion blow molding machine. Two hundred fifty containers were prepared for capping and filling with water and drop testing before and after aging in a walk-in oven maintained at 120° F. (49° C.) over a period of 28 days. At test periods of 2, 7, 14, 21 and 28 days, 40 bottles each were dropped from a platform on to a metal plate from a predetermined height. The height at which 50% of the containers would pass without failing was recorded. Initially, the 10-ounce containers produced from this neat material had an average drop height impact strength of around 5.2 feet, but after aging under the conditions described the drop impact height was reduced to about 4.3 feet that is 17% lower than the neat PET sample.

Example 2

In this Example, a concentrate consisting of 90 wt. % Polycarbonate, 5 wt. % Polycaprolactone and 5 wt. % Poly[(96.5)ethylene-co-(3.5)1,4-cyclohexylenedimethylene terephthalate] having a weight-average molecular weight of 40,000 to 55,000 was melt compounded in a twin-screw extruder for letdown into Poly[(96.5)ethylene-co-(3.5)1,4-cyclohexylenedimethylene terephthalate] having weight-average molecular weight of 70,000 to about 90,000 in the extrusion blow molding machine. This concentrate was blend with the higher molecular weight PET at the 1.5 wt. % level and extrusion blow molded into 10-ounce containers using conditions similar to those described in Example 1. Again, the containers were filled with water, capped and stored in the walk-in oven at 120° F. (49° C.) and drop impact tested over a period of 28 days. Initially, the drop impact height of containers produced from PET containing 1.5 wt. % of this concentrate was 8.8 feet that was significantly higher than the control (5.2 feet). Surprisingly, this calculates to be about 69% better than the control. However, after aging the containers in the walk-in oven under the conditions described in Example 1, the drop impact height decreased from 8.8 feet to about 6.2 feet after 28 days of exposure. Surprisingly, this is a decrease of about 29.5% in the drop height after this treatment. However, the drop impact strength is still about 44% better than the control sample when it's aged under the same conditions.

Example 3

A concentrate consisting of 95 wt. % Polycarbonate and 5 wt. % Polycaprolactone was melt compounded in a twin-screw and letdown in the higher molecular weight PET at the 1.5 wt. % level. Again, 10-ounce containers were produced and tested as described previously. Initially, the drop impact of the PET containers mixed with 1.5 wt. % of this concentrate had a drop impact height of around 7.5 feet. After aging at 120° F. (49° C.) for 28 days the drop impact height increased to about 8.9 feet that was totally unexpected. This is an improvement of 19% over the initial drop impact strength before aging and about 107% better than the control PET sample after it was aged for 28 days under similar conditions.

Example 4

A concentrate consisting of 85 wt. % Polycarbonate, 10 wt. % Poly[(96.5)ethylene-co-(3.5)1,4-cyclohexylenedimethylene terephthalate] having a weight-average molecular weight of around 40,000 to 55,000 and 5 wt. % Polycaprolactone was melt blended on a twin-screw extruder and chopped into pellets. The concentrate (1.5 wt. %) was subsequently blended with 98.5 wt. % Poly[(96.5)ethylene-co-(3.5)1,4-cyclohexylenedimethylene terephthalate] having a weight-average molecular weight of 70,000 to about 90,000 and extrusion blow molded into 10-ounce containers for testing drop impact strength as described in Example 10. The initial drop impact strength height was learned to be about 8.5 feet. After aging at 120° F. (49° C.) for 28 days it was surprising to find that the average drop height of the containers produced from this formulation was at 8.5 feet. This was totally unexpected. Again, this retention in average container drop height Was 98% better than the control average drop height after aging under similar conditions.

Example 5

As another Example, a concentrate consisting of 85 wt % Polycarbonate, 10 wt. % Polycaprolactone and 5 wt. % Poly[(96.5)ethylene-co-(3.5)1,4-cyclohexylenedimethylene terephthalate] having a weight-average molecular weight of around 40,000 to 55,000 was melt blended in a twin-screw extruder and chopped into pellets. The concentrate (1.5 wt. %) was subsequently blended with 98.5 wt. % Poly[(96.5)ethylene-co-(3.5)1,4-cyclohexylenedimethylene terephthalate] having a weight-average molecular weight of about 70,000 to 90,000 and extrusion blow molded into 10-ounce containers on an extrusion blow molding machine. The containers were filled, capped and tested for retention of average drop impact height as described in Example 1. Initially, containers produced from this formulation had an average drop height of around 8.4 feet that was learned to be about 62% higher than the initial average drop height found for the Control sample (5.2 feet) described in Example 1. After aging under the condition of 120° F. (49° C.) for 28 days, it was totally unexpected to find that the average drop height of extrusion blow molded PET 10-ounce bottles containing 1.5 wt. % of this concentrate had increased to an average drop height of 9.3 feet. This average drop height is about 116% better than the drop height of the Control sample aged under similar conditions.

Example 6

As a final Example, a concentrate consisting of 80 wt. % Polycarbonate, 10 wt. % Polycaprolactone and 10 wt. % Poly[(96.5)ethylene-co-(3.5)1,4-cyclohexylenedimethylene terephthalate] having a weight-average molecular weight of about 40,000 to 55,000 was melt blended in a twin-screw as previous described in the other Examples. One and one-half weight percent of the concentrate was blended with 98.5 wt. % Poly[(96.5)ethylene-co-(3.5)1,4-cyclohexylenedimethylene terephthalate] having a weight-average molecular weight of about 70,000 to 90,000 and extrusion blow molded into 10-ounce containers as previously described in Example 1. The containers were filled with water, capped and tested for retention of average drop height as discussed previously. Initially, containers produced from this Example had an average drop height of around 7.0 feet that was found 35% better than the initially average drop height found for the Control sample (5.2 feet) described in Example 1. After aging at 120° F. for 28 days, it was totally unexpected to discover that the average drop height was still maintained at around 7.0 feet.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

I claim:

1. A polymer blend comprising:
   (a) about 1 to 10 weight % of a concentrate comprising:

(1) about 70 to 95 weight % of a polycarbonate resin;

(2) about 5 to 30 weight % polycaprolactone having a weight average molecular weight of between about 10,000 and 100,000 and (3) about 0 to 25 weight % of a copolyester having repeat units derived from at least 90 mole % terephthalic acid, at least 85 mole % alkylene glycol and up to 15 mole % 1,4-cyclohexanedimethanol, said copolyester having a weight average molecular weight of between 40,000 and 55,000; and (b) about 99 to about 90 weight % of a copolyester having repeat units derived from at least 90 mole % terephthalic acid, at least 85 mole % ethylene glycol and from about 1.5 to 15 mole % 1,4-cyclohexanedimethanol, said copolyester having a weight average molecular weight of between 70,000 and 90,000.

2. The polymer blend of claim 1 wherein said polycarbonate is aromatic.

3. The polymer blend of claim 2 wherein said polycarbonate is prepared by reacting [2,2-bis(4-hydroxyphenyl)propane] with phosgene.

4. The polymer blend of claim 1 wherein said component (1)(a)(3) consists essentially of repeat units from terephthalic acid, about 95 to 99 mole % ethylene glycol and about 5 to 1 mole % 1,4-cyclohexanedimethanol.

5. The polymer blend of claim 1 wherein said component (1)(b) consists essentially of repeat units from terephthalic acid, about 95 to 99 mole % ethylene glycol and about 5 to 1 mole % 1,4-cyclohexanedimethanol.

6. The polymer blend of claim 1 wherein component (1)(a)(3) is poly[(96.5)ethylene-co-(3.5)1,4-cyclohexylenedimethylene terephthalate].

7. The polymer blend of claim 1 wherein component (1)(b) is poly[(96.5)ethylene-co-(3.5)1,4-cyclohexylenedimethylene terephthalate].

8. The polymer blend of claim 1 wherein component (1) (a) is present in an amount of about 1 to about 5 weight % and component (1) (b) is present in an amount of about 99 to about 95 weight percent.

9. An extrusion molded article comprising the polymer blend of claim 1.

10. A polymer blend having excellent clarity and impact strength which is suitable for use in extrusion blow molding processes comprising:

(a) about 1 to 10 weight % of a concentrate comprising:

(1) about 70 to 95 weight % of a polycarbonate resin;

(2) about 5 to 30 weight % polycaprolactone having a weight average molecular weight of between about 10,000 and 100,000 and (3) about 0 weight % to 25 weight % of a copolyester having repeat units derived from at least 90 mole % terephthalic acid, at least 85 mole % ethylene glycol and up to 15 mole % 1,4-cyclohexanedimethanol, said copolyester having a weight average molecular weight of between 40,000 and 55,000; and (b) about 99 to about 90 weight % of a copolyester having repeat units derived from at least 90 mole % terephthalic acid, at least 85 mole % ethylene glycol and from about 1.5 to 15 mole % 1,4-cyclohexanedimethanol, said copolyester having a weight average molecular weight of between 70,000 and 90,000.

* * * * *